United States Patent Office 3,289,604
Patented Dec. 6, 1966

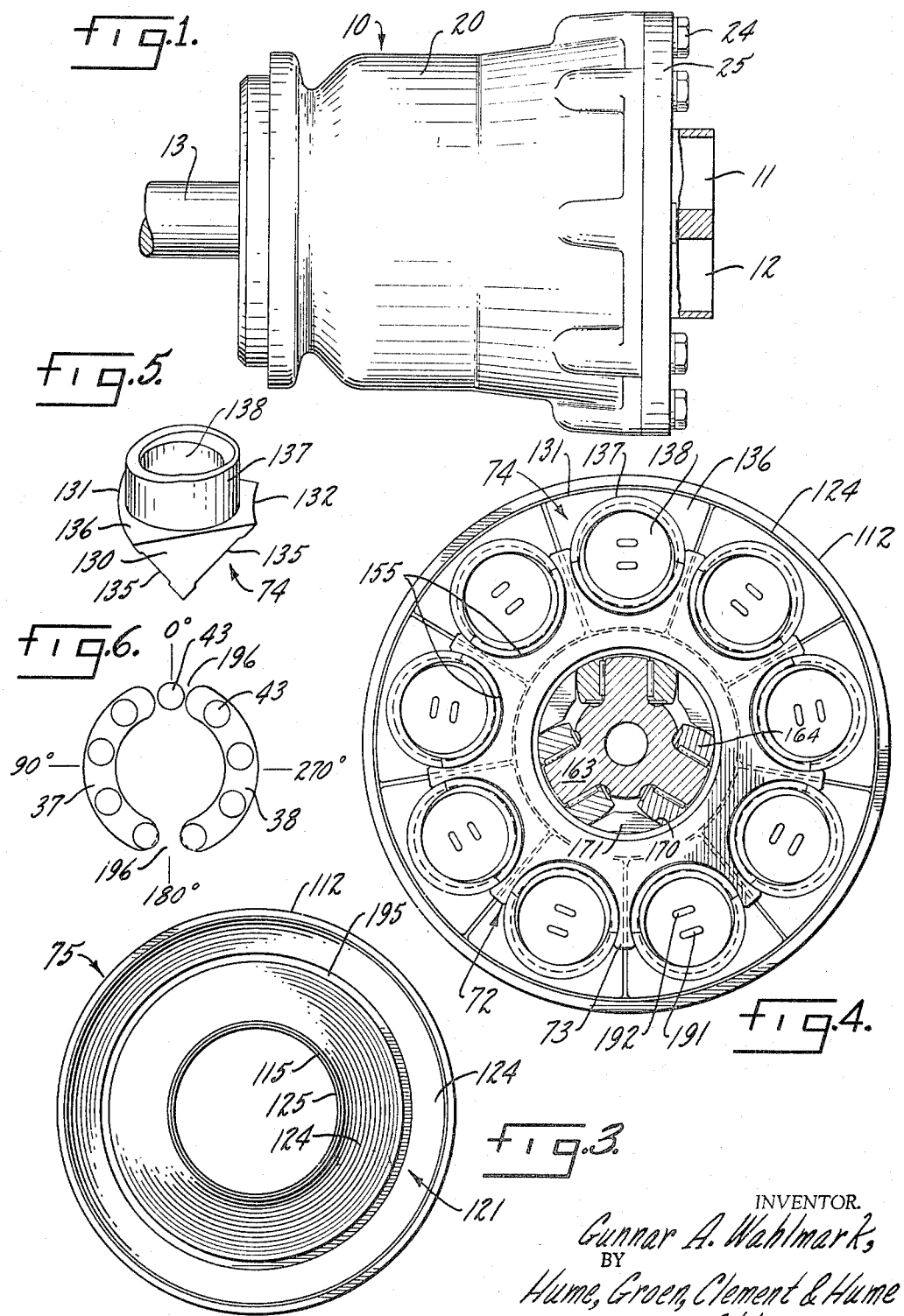

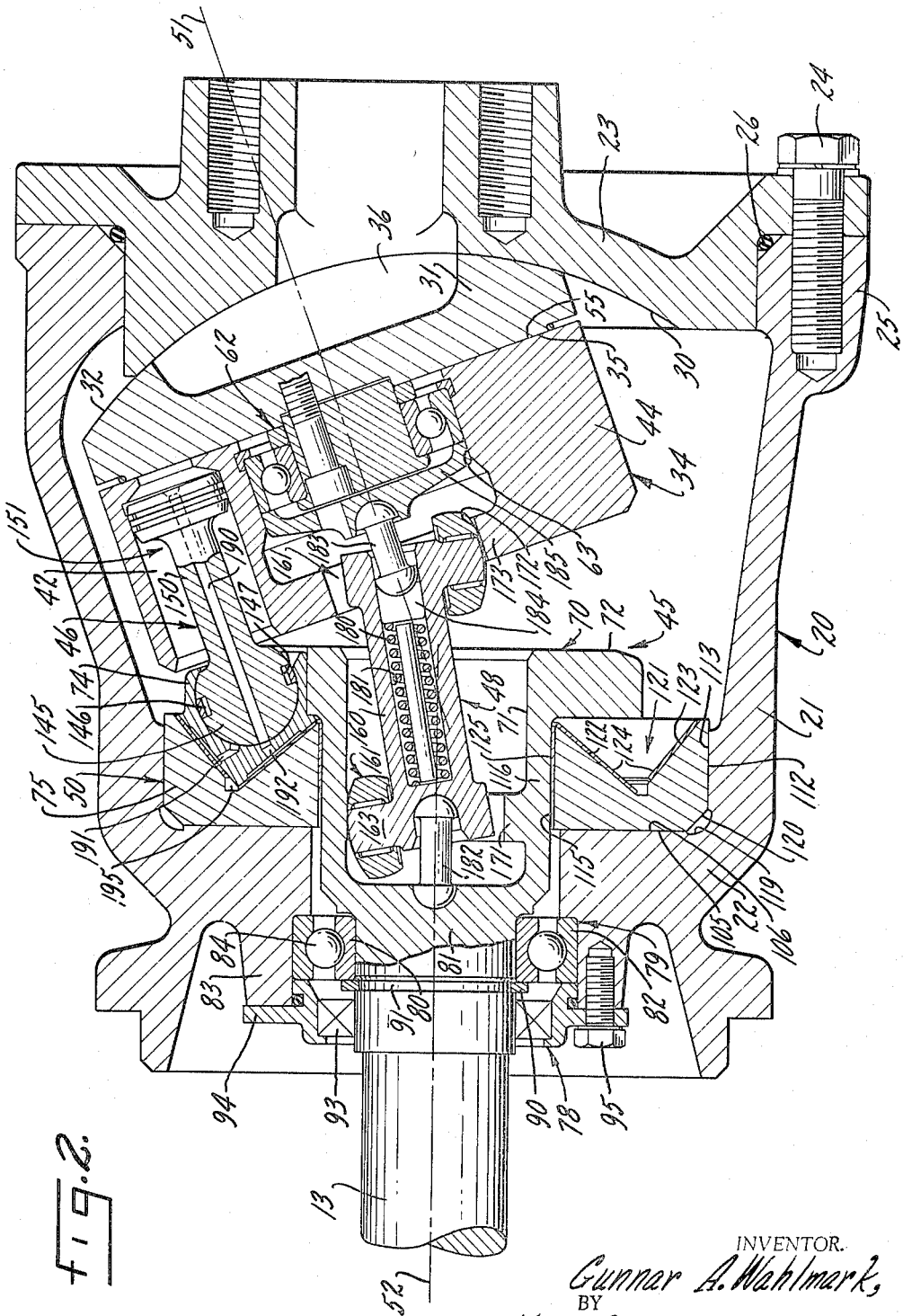

3,289,604
FLUID DEVICE
Gunnar A. Wahlmark, 211 S. Rockford Ave.,
Rockford, Ill.
Filed Sept. 23, 1964, Ser. No. 398,571
11 Claims. (Cl. 103—162)

The present invention relates in general to fluid devices. It deals more particularly with fluid devices of the swash plate type.

Swash plate type fluid devices are, of course, generally well known. An illustration is found in the Applicant's copending application, Serial No. 838,868, filed September 9, 1959, now Patent No. 3,136,264 entitled "Variable Displacement Fluid Device." As is pointed out in the aforementioned copending application, such fluid devices might take the form of a pump or a motor, embodying either a variable or fixed displacement construction.

Most swash plate type fluid devices employ a swash mechanism mounted for rotation about a fixed axis. A cylinder mechanism is suitably mounted for rotation about an axis angularly displaced from the axis of rotation of the swash mechanism. In some such devices the latter axis might be variably displaced. In any event, piston assemblies connect the swash mechanism and the cylinder mechanism, and the swash mechanism is subjected to both radial and axial loading from the piston assemblies as it rotates during operation of the pump or motor. The swash mechanism is supported in bearing relationship for rotation under such loading. The present invention is specifically concerned with bearing support of the swash mechanism under axial and radial loading, as well as with related features of the swash plate type fluid device.

It is an object of the present invention to provide an improved swash plate type fluid device.

It is another object to provide a new and improved bearing arrangement for supporting the swash mechanism in a swash plate type fluid device.

It is still another object to provide a unitary bearing arrangement which absorbs both axial and radial loading to which the swash mechanism is subjected.

It is a further object to provide a swash mechanism bearing arrangement which facilitates a substantially more compact fluid device construction.

It is still a further object to provide a quieter running swash plate type fluid device.

It is yet a further object to provide a bearing arrangement which has a longer service life, and is less expensive than presently known swash mechanism bearing arrangements.

It is yet another object to provide a bearing arrangement of the aforedescribed character which substantially obviates drive shaft overhang and, accordingly, reduces the chances of shaft deflection.

The foregoing and other objects are realized in accord with the present invention by providing an improved swash plate type fluid device incorporating a new and improved bearing arrangement. The bearing arrangement supports the swash mechanism for rotation about a fixed axis while the swash mechanism is subjected to both axial and radial loading. The bearing arrangement is embodied in a unitary construction which supports the swash mechanism under both the axial and radial loading and enhances the service life of the fluid device while reducing the cost thereof.

A further aspect of the invention results in lower noise levels for operation of the device. Features of the bearing arrangement and associated structure promote minimal bearing noise and virtually eliminate "bumping" normally encountered as a result of the momentary entrapment of fluid at top dead center in the rotation of the cylinder mechanism in a swash plate type fluid device.

The invention, both as to its organization and method of operation, taken with further objects and advantages thereof, will best be understood by reference to the following description taken with the accompanying drawings, in which:

FIGURE 1 is a top plan view, partially in section, of a swash plate type fluid pump embodying features of the present invention;

FIGURE 2 is an enlarged side elevational view, partially in section, of the fluid pump illustrated in FIGURE 1;

FIGURE 3 is a front elevational view of a bearing ring forming a part of the bearing arrangement embodying features of the present invention;

FIGURE 4 is a front elevational view of the bearing arrangement embodying features of the present invention;

FIGURE 5 is a perspective view of a shoe forming a part of the bearing arrangement embodying features of the present invention; and FIGURE 6 is a diagrammatic plan view of the cylinder porting arrangement for the pump embodying features of the present invention.

Referring now to the drawings, and particularly to FIGURE 1, a variable displacement fluid pump embodying features of the present invention is seen generally at 10. The pump 10 is designed to pump a petroleum fuel to a gas turbine engine (not shown), for example. It delivers approximately six gallons per minute of fuel at 1000 p.s.i., while requiring approximately eight driving horsepower.

At this point it would be well to point out that the present invention is equally applicable to both pumps and motors of the swash plate type, whether they be of fixed or variable displacement. The present invention is described in the context of a variable displacement fluid pump 10 to simplify the description and facilitate an understanding of the invention. Furthermore, it should be understood that the term fluid is used in its broad sense to cover any substance capable of being pumped, though in the present context the fluid is a liquid petroleum fuel.

The exemplary pump 10 draws the fuel from a fuel cell (not shown) through the inlet port 11, and expels it through the outlet port 12 to the plenum chamber (not shown) of a gas turbine engine, for example. The pump 10 is driven through a drive shaft 13 from a power take-off (not shown) in the turbine.

Turning to FIGURE 2, the pump 10 includes a casing 20 comprising a generally cylindrical body 21 closed at one end 22 and having an end cap 23 secured by bolts 24 over its open end 25. An O ring 26 suitably disposed between the cap 23 and the open end 25 of the body 21 provides a fluid tight seal therebetween. The body 21 and cap 23 are preferably formed of a hardened alloy steel.

Within the confines of the casing 20, an arcuate face 30 defining a track is formed in the cap 23 for slidably mounting a port block 31. The port block 31 is also formed of a hardened steel alloy and has an arcuate surface 32 engaging the face 30 for complementary sliding engagement in the track. The port block 31 mounts a cylinder mechanism 34 for rotation on its inner bearing surface 35.

Disposed in the port block 31 in a side-by-side relationship are an inlet chamber (not shown) and an outlet chamber 36. The inlet and outlet chambers are elongated, as will be noted, to assure registry with corresponding inlet and outlet ports 11 and 12 regardless of the position of the sliding port block 31 in its track. The inlet chamber (not shown) and the outlet chamber 36 are connected to an inlet kidney port 37 and outlet kidney port 38, respectively, formed in the bearing surface 35 of the port block 31 (as best seen in FIGURE 6).

The kidney ports 37 and 38 communicate with cylinders 42 appropriately disposed in the cylinder block 44 of the cylinder mechanism 34 through cylinder ports 43. The cylinder mechanism 34 is drivingly connected with a swash mechanism 45 by nine pistons 46 universally connected to the swash mechanism 45. The pistons 46 are reciprocable in corresponding cylinders 42 in the cylinder block 44 of the mechanism 34. The cylinder mechanism 34 and swash mechanism 45 are further interconnected in a well-known manner by a universal joint 48.

The swash mechanism 45 is mounted on the drive shaft 13 and seated against the closed end 22 of the body 21 on a bearing arrangement 50 embodying features of the present invention. Rotation of the swash mechanism 45 by drive shaft 13 is effective to induce rotation of the cylinder mechanism 34 through the pistons 46. Synchronised rotation of the swash mechanism 45 and the cylinder mechanism 34 is maintained by the universal joint 48 while the pistons 46 are introduced and withdrawn from corresponding cylinders 42 by rotation of the swash mechanism 45.

Depending upon the angular displacement of the axis 51 of rotation of the cylinder mechanism 34 to the axis 52 of rotation of the swash mechanism 45, rotation of the cylinder mechanism 34 with concomitant introduction and withdrawal of the pistons 46 in corresponding cylinders 42 causes a predetermined amount of fuel to be drawn into the pump 10 through the inlet port 11 from the fuel cell (not shown) and pumped out through the outlet port 12. Displacement of the axis 51 from the axis 52 is, in turn, controlled by sliding the port block 31 in its track 30 to establish a prescribed angular relationship between the axes and, accordingly, a prescribed effective displacement for the pistons 46 in corresponding cylinders 42. Adjustment of the port block 31 in its track 30 is preferably accomplished in the manner described and illustrated in the aforementioned co-pending application. The adjustment mechanism forms no part of the present invention and, accordingly, is not further discussed.

The cylinder barrel 44 of the cylinder mechanism 34 is preferably formed of a hardened steel and the nine cylinders 42 extend through it in parallel relationship with its axis 51 of rotation. The cylinders 42 are annularly spaced in the barrel 44, as will be recognized from FIGURE 6. The outer bearing surface 55 of the barrel 44 seats in bearing relationship against the bearing surface 35 of the port block 31. The barrel 44 rotates in bearing relationship against the port block 31 on a thrust bearing assembly 62 disposed in the axially disposed passage 63 extending through the block 44.

Since the bearing assembly 62 forms no specific part of the present invention, it is not described in further detail here. Suffice it to say that the bearing assembly 62 is mounted on the port block 31 and defines a fixed axis of rotation for the cylinder block 44. The bearing assembly 62 also acts to hold the cylinder barrel surface 55 in bearing relationship against the bearing surface 35 of the port block 31 when the pump 10 is not operating. As will hereinafter be more fully explained, fluid pressure in the cylinders 42 performs the latter task during operation.

The swash mechanism 45 and bearing arrangement 50 are virtually part and parcel of each other, as will hereinafter be recognized. In fact, they form so compact a relationship as to markedly reduce space requirements in a swash plate type fluid device such as the pump 10. Accordingly, smaller, lighter, less expensive fluid devices of this type are possible.

The swash mechanism 45 itself includes a swash spider member 70 formed on the inner end of the drive shaft 13. The swash spider member 70 is broadly cup-shaped in configuration, formed of hardened steel, and has a bore 71 extending inwardly from its outer face 72. Referring to FIGURE 4, radially disposed fingers 73 extend from the periphery of the member 70 and cooperate with bearing shoes 74 slidable in a bearing ring 75 forming part of the bearing arrangement 50. The shoes 74 are, in turn, universally connected with corresponding pistons 46. This will hereinafter be discussed in detail.

The spider member 70 on the end of the shaft 13 extends through a face seal 78 and an outer bearing 79 in the closed end 22 of the casing body 21. The bearing 79 includes an inner bearing race 80 encircling the outer neck 81 of the swash spider member 70. An outer bearing race 82 is seated within an annular lip 83 formed outwardly of the closed end 22 of the casing body 21. A plurality of ball bearings 84 are mounted between the bearing races 80 and 82 and support the shaft 13 and spider member 70 for rotation in the casing body 21 at its point of entry, as will be noted.

The seal 78 is designed to prevent loss of fuel from the casing 20, of course. The seal 78 includes a steel snap ring 90 seated in an annular recess 91 in the outer neck 81 of the swash spider member 70. The ring 90 holds the entire shaft assembly together. A standard shaft seal 93 is positioned outside the ring 90. A cover plate 94 is secured to the aforementioned lip by conventional machine bolts 95 and holds the seal 93 in place.

Referring to FIGURES 2 and 4, it will be seen that there are nine spider teeth 73 on the spider member 70 and they separate and position nine bearing shoes 74 for annular sliding travel in the bearing ring 75 underlying the overhanging spider teeth. The bearing ring 75 comprises an annular ring of hardened steel or the like having its inner face 105 seated snugly against the inner face 106 of the closed end 22 on the casing body 21. The outside diameter of the annular ring 75 is such that its cylindrical outer face 112 seats snugly within the body 21 of the casing 20 adjacent the closed end 22. The cylindrical inner surface 115 of the ring 75 is of such diameter that the body 116 of the swash spider member 70 rotates freely within its confines. An annular trough 119 at the juncture of the end surface 106 and the cylindrical surface 113 of the body 21 assures proper seating of the ring 75 by providing a repository for the foreign matter and the like which might otherwise interfere with such seating. The ring 75 is bevelled around its periphery at 120 to further enhance this good seating characteristic.

The shoes 74 slide in a V-shaped annular track 121 formed in the ring 75. The V-shaped track 121 has oppositely disposed faces 122 and 123 inclined at an angle of 90° to each other and annular frusto conical slippers 124 formed of bearing bronze or the like are seated on the surfaces 122 and 123, as illustrated. A cylindrical shim 125 of similar bronze bearing material is mounted between the cylindrical inner surface 115 of the ring 75 and the body 116 of the spider member 70. The slippers 124 provide bearing surfaces for the shoes 74 while the shim 125 acts as a bearing surface between the spider member body 116 and the ring 75.

Each of the shoes 74 is identical in construction, as illustrated in FIGURE 5, and includes a wedge shaped base 130 formed on an arc corresponding to the arc of the track 121. The base 130 has an arcuate outer face 131 and an arcuate inner face 132 inclined at 90° to each other. To provide a lubrication reservoir on the bearing surfaces, relief area 135 are formed in the faces 131 and 132 extending across their widths.

Extending outwardly of the upper planar surface 136 on the wedge shaped base 130 of each shoe 74 is a cylindrical turret 137 containing a segmentally spherical socket 138. The socket 138 encloses approximately 220 spherical degrees and receives the ball joint 145 on a corresponding piston 46. The ball joint 145 of each piston 46 is seated and locked in a corresponding socket 138 through the medium of a locking ring 146 seated in a peripheral aperture 147 in the ball 145 in the manner described in the applicant's co-pending application, Serial No. 133,233, filed August 22, 1961, now Patent No. 3,193,868 entitled "Drive Connection for Fluid Device."

Each piston 46 further includes a shaft 150 and a piston head 151. The piston head is preferably of the spherical ring type, as illustrated in the applicant's Patent No. 2,956,845, issued October 18, 1960, and entitled "Piston."

Bracketing the turret 137 on each shoe 74; and accordingly, the corresponding ball and socket connection with a piston 46, the teeth 73 on the spider member 70 have arcuate surfaces 155 inter-connecting them and complementary with the cylindrical turret 137. Accordingly, the turret 137 on each shoe 74 seats in snug but loosely meshed relationship with the spider member 70. Nine shoes 74 are slidable around the track 121 in mesh with the rotating spider member 70.

As the bearing shoes 74 are driven around the track 121 by the rotating spider 70, piston heads 151 are introduced to and withdrawn from corresponding cylinders 42 to a predetermined extent dependent upon the relationship between the axes 51 and 52 of rotation of the cylinder mechanism 34 and the swash mechanism 40, as has been pointed out. Fuel is drawn into the cylinder 42 as the cylinder mechanism 34 rotates between 0° and 180° (the shaft 13 drives the pump in a counterclockwise direction) and pumped out as the mechanism 34 rotates between 180° and 0° once more.

The constant speed joint 48 maintains synchronised rotation between the swash mechanism 45 and the cylinder mechanism 34 and includes a shaft 160 having a conventional three roller gear arrangement 161 formed on each end thereof. Each three roller gear arrangement 161 is identical in construction and includes three radially extending arms 163 mounting roller bearings 164 on radial axes. Radially disposed bearing surfaces 170 formed on a shoulder 171 within the cup-shaped depression 71 in the spider member 70 complementarily engage the roller bearings 164 on one end of the shaft 160 while identical bearing surfaces 172 formed on a shoulder 173 within the passage 63 extending through the cylinder block 44 complementarily engage the roller bearings 164 formed on the opposite end of the shaft 160. This is a well known construction and is not discussed here in further detail.

The universal joint 48 also serves another function. A coil spring 180 seated in an axially disposed passage 181 in the shaft 160 exerts pressure through a pair of pin universal joints 182 and 183 to hold the port block 31 in its track 30 when the pump 10 is not operating or operation has just been initiated. The joint 182 is universally mounted between the swash spider member body 116 and the shaft 160 while the joint 183 is universally mounted between a joint block 184 seated against the spring 180 and a cage 185. The cage 185 is seated against the thrust bearing assembly 62 in a well known manner. After the pump 10 is operating normally, a prescribed pressure balance relationship between pressure responsive areas within the cylinders 42 and on the bearing surfaces 35, 55 and 32, 30, serves to urge the cylinder block 44 and the port block 31 into properly seated relationship as discussed in detail in the aforementioned copending application entitled "Variable Displacement Fluid Device."

As has been pointed out, simultaneous rotation of the swash mechanism 45 and the cylinder mechanisms 34 by the rotating drive shaft 13 is effective to cyclically withdraw and introduce the pistons 46 to corresponding cylinders 42. From top dead center or 0°, as illustrated in FIGURE 2, a piston head 151 is withdrawn to draw fluid into a corresponding cylinder 42 through its inlet port 43 as the cylinder block 44 rotates through 180° of rotation toward bottom dead center (180° in FIGURE 6). At bottom dead center, the piston head 151 has reached maximum displacement in the cylinder 42 for a prescribed angular relationship between the axes 51 and 52. Subsequent rotation of the cylinder block 44 through 180° back to top dead center forces the piston head 151 in question back into a corresponding cylinder 42 and the fluid in a corresponding cylinder out an appropriate port 43.

As the shoes 74 slide around the track 121 in the bearing ring 102, the pistons 46 each exert a load on the bearing arrangement 50 along their axes, of course. Since the axis of each piston 46 is directed toward the inner surface 122 in V-shaped track 121 as the piston moves from 270° to 90° over top dead center, and toward the outer surface 123 of the V-shaped track 121 as the piston moves from 90° to 270° under bottom dead center, that area of the ring 75 which is subjected to maximum stress is constantly shifting. This constantly shifting stress distribution assures longer pump life, as would be expected, while minimizing maintenance problems.

In being driven around the track 121, the shoes 74 slide on the bronze bearing slippers 124, of course. Lubrication for the sliding movement is provided by directing fluid to the face reliefs 135 on the shoes. Fluid passes from each cylinder 42 through a passage 190 formed through each piston shaft 150, ball 145, and head 151. Each passage 190 carries the fluid to angularly displaced passages 191 and 192 extending through the shoes 74 from the base of each socket 138 to the reliefs 135. To prevent excess loss of fluid and still assure good lubrication, the passage 190 through each piston 46 is only intermittently in communication with one or the other of the passages 191 and 192. In fact, it provides a jet of lubricating fluid to alternate reliefs 135 only at top dead center and bottom dead center. In addition to the foregoing, lubricating fluid also tends to leak into the annular well 195 in the V-track 121 from which it distributes to various bearing surfaces.

The effective result of the foregoing lubrication system is to provide a hydrostatic bearing arrangement for the shoes 74 which incorporates self compensating lubricating film thickness control. As the speed and, accordingly, load on the bearing surfaces increase, the amount of lubricating fluid directed to the bearing surfaces 131, 132 is increased. Film thickness thus tends to increase.

The lubricating passage complex hereinbefore discussed provides an additional unique advantage according to the present invention. Referring to FIGURE 6, it will be noted that the space 196 between the kidney ports 37 and 38 at both top and bottom dead center is slightly wider than the width of the cylinder inlet ports 43. Actually it is about .001 to .005 inch wider. Accordingly, at top dead center there tends to be some entrapment of fluid in the cylinder 42 and a "bumping" effect is realized. In the present invention, however, the lubrication passage complex 190, 191 and 192 provides a pressure release at top dead center for lubrication purposes and this "bumping" is eliminated. A substantially quieter running pump 10 is thus afforded.

Various aspects of the present invention afford numerous advantages in variable displacement fluid devices, as should now be well understood. For example, no roller bearing parts are necessary to support the swash mechanism 45 in axial and radial bearing relationship. Furthermore, the bearing arrangement 50 is positioned longitudinally of the shaft 13 at virtually its outermost extremity and, accordingly, practically no shaft overhang remains to permit shaft deflection under shock loading or the like. The service life of such a bearing arrangement 50 is substantially longer than heretobefore thought possible with roller bearing arrangements, this life expectancy being enhanced by the lubrication arrangement provided according to the present invention. The efficacy of the lubrication arrangement in preventing "bumping" noise has immediately hereinbefore been discussed and need not be re-emphasized.

While the embodiment described herein is at present considered to be preferred, it is understood that various modifications and improvements may be made therein, and it is intended to cover in the appended claims all such modifications and improvements as wall within the true spirit and scope of the invention.

What is desired to be claimed and secured by Letters Patent of the United States is:

1. In a fluid device wherein a rotatable swash mechanism is universally drivingly connected with a rotatable cylinder mechanism and a plurality of pistons are operatively disposed between the mechanisms for reciprocation in the cylinder mechanism, the improvement comprising: an annular bearing ring having a bearing track formed therein, a plurality of bearing shoes seated on and slidable around said track, and spider means on the wash mechanism in mesh with said shoes whereby said shoes and the swash mechanism rotate together around an axis of rotation, said shoes being universally connected to the pistons.

2. The improvement in fluid device of claim 1 further characterized in that said track in substantially V-shaped in cross section.

3. The improvement in fluid device of claim 2 further characterized by and including frusto-conical shim means fabricated of bearing material and seated in said V-shaped track.

4. The improvement in fluid device of claim 3 further characterized in that each of said bearing shoes includes a wedge-shaped base means seated in complementary sliding engagement in said track.

5. The improvement in fluid device of claim 4 further characterized in that each of said bearing shoes includes a housing surmounting said base, said spider means including radially extending finger means complementarily engaging and partially encircling each housing.

6. The improvement in fluid device of claim 4 further characterized by and including arcuately formed bearing faces on the wedge shaped base means of each of said bearing shoes, said bearing faces having relief means formed therein for receiving and retaining lubricating fluid.

7. The improvement in fluid device of claim 6 further characterized in that said V-shaped track has well means formed therein for serving as a lubricant reservoir.

8. A fluid device, comprising: a casing, a cylinder mechanism rotatable in said casing, a swash mechanism rotatable in said casing, a plurality of pistons reciprocable in cylinders in said cylinder mechanism, an annular bearing ring seated in said casing and having a bearing track formed therein, a plurality of bearing shoes seated on and slidable around said track, spider means on the swash mechanism in mesh with said shoes whereby said shoes and said swash mechanism rotate together around an axis of rotation, a socket formed in each of said bearing shoes, and a ball joint formed on each of said pistons and seated in a corresponding socket whereby said shoes are universally connected to said pistons.

9. The fluid device of claim 8 further characterized by and including bearing face means on each of said shoes in engagement with said track, lubrication passage means extending through each of said shoes from said bearing faces to a corresponding socket, and passage means through said pistons to said sockets for delivering lubricating fluid to said sockets and thus to said bearing faces.

10. The fluid device of claim 9 further characterized in that said lubrication fluid passage means in each of said shoes is positioned so that they are aligned with said piston passage and lubrication fluid is delivered to said bearing faces through said passages only when a corresponding piston and cylinder passes top dead center and bottom dead center in rotation with said cylinder mechanism.

11. The fluid device of claim 10 further characterized in that each cylinder is momentarily closed as it rotates past top dead center in rotation with said cylinder mechanism, the flow of lubricating fluid through said passages at top dead center serving to relieve any pressure build-up in said cylinder and substantially prevent "bumping."

References Cited by the Examiner

UNITED STATES PATENTS

| 1,780,365 | 11/1930 | Sherman | 74—60 |
| 2,549,711 | 4/1951 | Ruben | 103—162 X |
| 2,776,628 | 1/1957 | Keel | 74—60 X |
| 3,050,014 | 8/1962 | Sullivan | 103—162 |
| 3,198,130 | 8/1965 | Thoma | 103—162 |

FOREIGN PATENTS 4,830   12/1876   Great Britain.

OTHER REFERENCES

German printed application 15,382, September 1955.

MARTIN P. SCHWADRON, *Primary Examiner.*

SAMUEL LEVINE, *Examiner.*

I. C. COHEN, *Assistant Examiner.*